United States Patent [19]
Dahlgren et al.

[11] Patent Number: 5,794,050
[45] Date of Patent: Aug. 11, 1998

[54] NATURAL LANGUAGE UNDERSTANDING SYSTEM

[75] Inventors: Kathleen Dahlgren; Edward Stabler. both of Los Angeles, Calif.

[73] Assignee: Intelligent Text Processing, Inc.. Santa Monica, Calif.

[21] Appl. No.: 943,069

[22] Filed: Oct. 2, 1997

Related U.S. Application Data

[63] Continuation of Ser. No. 369,034, Jan. 4, 1995, abandoned.

[51] Int. Cl.$^6$ .................................................. G06F 9/45
[52] U.S. Cl. ........................... 395/708; 395/705; 395/707
[58] Field of Search ............................ 395/705, 707, 395/708

[56] References Cited

U.S. PATENT DOCUMENTS

| | | | |
|---|---|---|---|
| 4,887,212 | 12/1989 | Zamora et al. | 364/419.08 |
| 4,974,191 | 11/1990 | Amirghodsi et al. | 364/419.08 |
| 5,062,074 | 10/1991 | Kleinberger | 395/600 |
| 5,200,893 | 4/1993 | Ozawa et al. | 364/419.1 |
| 5,265,065 | 11/1993 | Turtle . | |
| 5,331,554 | 7/1994 | Graham | 364/419.07 |
| 5,331,556 | 7/1994 | Black, Jr. et al | 395/759 |
| 5,369,577 | 11/1994 | Kadashevich et al. | 364/419.13 |
| 5,404,295 | 4/1995 | Katz et al. | 364/419.19 |
| 5,418,948 | 5/1995 | Turtle | 395/600 |
| 5,488,725 | 1/1996 | Turtle | 395/600 |
| 5,519,608 | 5/1996 | Kupiec | 364/419.08 |
| 5,526,259 | 6/1996 | Kaji | 364/419.03 |
| 5,541,836 | 7/1996 | Church et al. | 364/419.07 |

OTHER PUBLICATIONS

Dahlgren, K., "Naive Semantics for Natural Language Understanding," Kluwer Academic Publishers, Norwell, MA, CH's 1-8, 1988.

*Primary Examiner*—Emanuel Todd Voeltz
*Assistant Examiner*—Peter J. Corcoran, III
*Attorney, Agent, or Firm*—Hecker & Harriman

[57] ABSTRACT

The present invention interprets natural language input using common sense reasoning. The invention avoids the combinatorial explosion that has occurred in other natural language understanding systems. The invention uses modules for parsing, disambiguation, formal semantics, anaphora resolution, and coherence, and a naive semantic lexicon. The naive semantic lexicon is consulted by the parsing, disambiguation, formal semantics, anaphora resolution, and coherence modules to determine whether an interpretation alternative is plausible based on the world knowledge contained in the naive semantic lexicon. The parsing module employs both a top-down and bottom-up parsing strategy. The parsing module consults the naive semantic lexicon to build a structure from natural language input that has both semantic and pragmatic plausibility. The invention uses a psychologically-motivated naive semantic ontology that provides a means for classifying concepts. The lexicon relates word senses to the ontological concepts, contains word sense-specific common sense knowledge, and connects syntactic information with the meaning of each word sense. Using the natural language understanding of the present invention, a process is used for retrieving text that includes the steps of: 1) natural language understanding of a document base, 2) natural language understanding of a text retrieval request (i.e., query), 3) a comparison of the output of steps 1 and 2.

30 Claims, 6 Drawing Sheets

NATURAL LANGUAGE UNDERSTANDING SYSTEM

This is a continuation of application Ser. No. 08/369.034 filed on Jan. 4, 1995 now abandoned.

BACKGROUND OF THE INVENTION

1. Field of the Invention

This invention relates to natural language interpretation using a computer system.

2. Background Art

Communication with computer systems is accomplished with the use of binary code sequences (so called "machine language") that the computer processor can interpret as instructions. It is difficult to communicate in binary code, so artificial programming languages have been created to make it easier to communicate with a computer system. A programming language for a computer system is a language that can be interpreted or translated into binary code or into a language that itself can ultimately be translated into binary code. Examples are "C", "Basic", "Pascal", "Fortran", etc. Artificial languages have strict rules of syntax, grammar, and vocabulary. Variations from the rules can result in error in communicating with the computer system.

The prior art has attempted to create new, so called "high level" artificial languages that are more like a "natural" language. A natural language is a language, such as English, used by humans to communicate with other humans. However, such high level artificial languages still include strict rules and limitations on vocabulary.

Other attempts have been made to provide a means to interpret communication in natural languages and provide translations of these communications to the computer system for processing. In this manner, a human user could communicate commands or requests to a computer system in English, and the communication could be translated into machine language for use by the computer system. Such attempts are referred to as computerized natural language understanding systems.

Computerized natural language understanding could be used to interpret a query that a user provides to the computer in a natural language (e.g., English). One area where the computerized ability to interpret language could be used is to retrieve text from a text retrieval system based on a human language query.

Existing text retrieval systems store texts (i.e., a document base) and provide a means for specifying a query to retrieve the text from the document base. Prior art text retrieval systems use several types of approaches to provide a means for entering a query and for retrieving text from the document base based on the query.

One approach, a statistical approach, implements a keyword-based system. In this approach, Boolean (i.e., logical) expressions that consist of keywords are used in the query. This approach uses a directory that consists of keywords and the locations of the keywords in the document database. For example, this approach uses a query such as the following that consists of keywords delimited by Boolean operators (the keywords are italicized and the Boolean operators are capitalized):

(attack or change) AND (terrorist OR guerrilla) AND (base OR camp OR post)

The keywords input as part of the query are compared to the keywords contained in the directory. Once a match is found, each location contained in the directory that is associated with the matched keyword can be used to find the location of the text (i.e., keyword) in the document database.

Text retrieval systems are evaluated by two measures, precision and recall. Recall measures the ratio between the number of documents retrieved in response to a given query and the number of relevant documents in the database. Precision measures the ratio between the number of relevant documents retrieved and the total number of documents retrieved in response to a given query. All commercially available and research text retrieval systems perform poorly on both measures. The best research systems do not reach 40% precision and 40% recall. Thus there is built-in tradeoff between recall and precision in keyword-based systems. However, it cannot retrieve text based on the actual meaning and subject content of the documents, so that any texts using different words with the same meaning will not be retrieved. On the other hand, texts using the same words in different meanings will be erroneously retrieved.

Furthermore, the keyword-based approach (employed in all commercial systems) has a built-in tradeoff between precision and recall. When the keyword-based approach has good recall, precision is poor. On the other hand, when precision is good, recall is poor. Thus, when it has good recall, it retrieves many or all of the documents which are relevant to the query, but it also retrieves many others which are irrelevant, and the user has to waste time inspecting many unwanted documents. On the other hand, when precision is good, many of the relevant documents are not retrieved, so that the user cannot be confident that all or enough of the desired information has actually been retrieved and displayed in response to the query.

The reason for poor precision is that the keyword-based approach inspects only surface forms (words and their locations relative to each other in the text), and assumes that these surface features accurately reflect meaning and content. But words are ambiguous and mean different things in context.

In the query above, the words "charge" and "attack" have many meanings, both as nouns and verbs, in English. Similarly, "base", "camp" and "post" are ambiguous. In a document database, they can occur in many texts which have nothing to do with terrorist attacks. Here are some sample irrelevant texts which a keyword-based system would erroneously retrieve in response to the above query:

The ambassador suffered a heart attack directly after his speech at the army base denouncing the guerrillas.

The base commander charged the guerrilla group with treaty violations.

On the other hand, the reason for poor recall is that natural language affords literally thousands of ways of expressing the same concept or describing the same situation. Unless all of the words which could be used to describe the desired information are included in the query, all of the documents can't be retrieved. The reason poor recall systematically results in the context of good precision is that to the extent that the keyword-based system retrieves precisely, the query has enough keywords in it to exclude many of the irrelevant texts which would be retrieved with fewer keywords. But by the same token, and by the very nature of the technology, the addition of keywords excludes a good number of other retrievals which used different combinations of words to describe the situation relevant to the query. For example, the query above would miss relevant texts such as:

The guerrillas bombed the base. The guerrillas hit the base. The guerrillas exploded a bomb at the base. The terrorists bombed the base. The terrorists hit the base. The terrorists exploded a bomb at the base.

This approach has the further disadvantage of using a query language that consists of keywords separated by Boolean operators. A user has difficulty understanding this query structure. Further, it is difficult for a user to predict which words and phrases will actually be present in a relevant document.

Several improvements have been attempted for keyword-based approach. Examples of such improvements include the use of synonym classes, statistical ranking of texts, fuzzy logic, and concept clustering. However, none of these provide any significant improvement in the precision/recall tradeoff. Further, none of these approaches provides a solution to the difficulty with using a Boolean query language.

Another approach implements a semantic network to store word meanings. The basic idea is that the meaning of a word (or concept) is captured in its associated concepts. The meaning is represented as a totality of the nodes reached in a search of a semantic net of associations between concepts. Similarity of meaning is represented as convergence of associations. The network is a hierarchy with "isa" links between concepts. Each node is a word meaning or concept. By traversing down through a hierarchy, a word meaning (or concept) is decomposed.

For example, within one branch of a hierarchy, an ANIMAL node has a child node, BIRD, that has a child node entitled CANARY. This hierarchy decomposes the meaning of the ANIMAL concept into the BIRD concept which is further decomposed into a CANARY. Properties that define a concept exist at each node in the hierarchy. For example, within the ANIMAL branch of the hierarchy, the BIRD node has "has wings" and "can fly" properties. The CANARY node has "can sing" and "is yellow" properties. Further, a child node inherits the properties of its ancestor node(s). Thus, the BIRD node inherits the properties of the ANIMAL, and the CANARY node inherits the properties of the BIRD and ANIMAL nodes.

The semantic net idea is an important one in artificial intelligence and some version of a classification scheme is incorporated in all semantic representations for natural languages. However, in these prior versions, the classification scheme is: 1) not tied to the specific meanings (senses) of words, 2) not based upon psycholinguistic research findings, 3) not integrated with syntactic information about word senses, and 4) not deployed during parsing.

Furthermore, it has been assumed, in prior approaches, that word meanings can be decomposed into a relatively small set of primitives, but it has been shown that lexical knowledge is not limited to a finite set of verbal primitives. Most importantly, no knowledge representation scheme for natural language, including any semantic net representation, has been able to overcome the apparent intractability of representing all of the concepts of a natural language. Small examples of semantic nets were created, but never a large enough one to provide the basis for a natural language system.

Another type of network approach, neural net, attempts to simulate the rapid results of cognitive processes by spreading the processing across a large number of nodes in a network. Many nodes are excited by the input, but some nodes are repeatedly excited, while others are only excited once or a few times. The most excited nodes are used in the interpretation. In the model, the input is repeatedly cycled through the network until it settles upon an interpretation.

This method substitutes the difficult problem of modeling human parsing on a computer with modeling language learning on a computer. Researchers have known and formalized the parsing rules of English and other natural languages for years. The problem has been the combinatorial explosion. This method provides no new insights into parsing strategies which would permit the efficient, feasible application of the rules on a computer once the system has automatically "learned" the rules. Nor has any such system as yet learned any significant number of rules of a natural language.

Another approach, a "traditional" approach, attempts to interpret language in a manner that more closely parallels the way a human interprets language. The traditional approach analyzes language at a number of levels, based on formal theories of how people understand language. For example, a sentence is analyzed to determine a syntactic structure for the sentence (i.e., the subject, verb and what words modify others). Then a dictionary is used to look up the words in the sentence to determine the different word senses for each word and then try to construct the meaning of the sentence. The sentence is also related to some knowledge of context to apply common sense understanding to interpret the sentence.

These approaches, which were the main focus of research in the 1970's and 1980's have not worked in the past, for two main reasons. First, the traditional approach creates a combinatorial explosion of analyses. There are too many ways to analyze a sentence and too many possible meanings for the words in the sentence. Because of this combinatorial explosion, a simple sentence can take hours or days to process. Current implementations of the traditional approach have no means for blocking the combinatorial explosion of the analysis. Further, there is no adequate ability to reason about the feasible meaning of the sentence in context.

As a result of these problems, leading experts in the field of computational linguistics have abandoned the traditional approach. For example, Eugene Charniak of Brown University abandons the traditional approach in favor of a statistical approach and states, in his 1993 book STATISTICAL LANGUAGE LEARNING (Cambridge, Mass. MIT Press). He states:

"I think it is fair to say that few, if any, consider the traditional study of language from an artificial intelligence point of view a 'hot' area of research . . . language comprehension from an AI point of view assumes that language understanding depends on a lot of "real-world knowledge" and that our programs must have it if they are ultimately to succeed."

In support of his decision to abandon the traditional approach in favor of a statistical approach, Eugene Charniak further states:

"There is nothing wrong with [the traditional approach] as far as it goes. But at the same time anyone familiar with [artificial intelligence] must realize that the study of knowledge representation—at least as it applies to the "commonsense" knowledge required for reading typical texts such as newspapers —is not going anywhere fast. . . Thus many of us in [artificial intelligence-natural language processing] have found ourselves in the position of basing our research on the successful completion of other's research—a completion that is looking more and more problematic. It is therefore time to switch paradigms."

Thus, none of the above approaches provide an ideal system that allows an individual to state a query in a natural language (i.e., English) in much the same way that the individual would pose a question to or interface with an associate. Further, none of the above approaches provides an optimal combination of recall and precision in a text retrieval such that the maximum number of documents that provide an accurate response to a text retrieval query are retrieved. None of the above approaches has been able to control the combinatorial explosion of analyses. None of the above approaches has been able to surmount the intractability of common sense reasoning.

SUMMARY OF THE INVENTION

The present invention provides the ability for a computer system to interpret natural language input. It avoids the combinatorial explosion that has been an obstacle to natural language interpretation. Further, the present invention uses common sense knowledge (or world knowledge) to interpret natural language input.

The present invention uses modules for parsing, disambiguation, formal semantics, anaphora resolution and coherence, and a naive semantic lexicon to interpret natural language input. The naive semantic lexicon is consulted by the other modules to determine whether an interpretation alternative is plausible, that is, whether the interpretation alternative makes sense based on the world knowledge contained in the naive semantic lexicon. By eliminating the implausible alternatives at each decision point in the interpretation, the potentially unlimited combinations of alternatives can be eliminated thereby avoiding the combinatorial explosion that has occurred in past attempts at natural language interpretation.

The use of naive semantics is crucial at all levels of analysis, beginning with the syntax, where it is used at every structure building step to avoid combinatorial explosion. The key idea of this approach to semantics is that people rely on superficial, commonsense knowledge when they speak or write. That means that understanding should not involve complex deductions or sophisticated analysis of the world, but just what is immediately "obvious" or "natural" to assume. This knowledge often involves assumptions (sometimes "naive" assumptions) about the world, and about the context of the discourse.

The present invention uses a naive semantic ontology which is a sophisticated semantic net. The ontology provides a means for classifying basic concepts and interrelationships between concepts. The classification system used by the present invention provides psychologically motivated divisions of the world. A dictionary (lexicon) relates word senses to the basic ontological concepts and specifies common sense knowledge for each word sense. The dictionary connects syntactic information with the meaning of a word sense. The lexicon is unique in its integration of syntactic facts, ontological information and the commonsense knowledge for each sense of each word. Further, the lexicon is unique because it is psychologically motivated.

Text retrieval provides one application of the natural language interpretation capability of the present invention. Feasible text retrieval is based on the "understanding" of both the text to be retrieved and the request to retrieve text (i.e., query). The "understanding" of the text and the query involve the computation of structural and semantic representations based on morphological, syntactic, semantic, and discourse analysis using real-world common sense knowledge.

The interpretative capabilities of the present invention are used in two separate processes. The first process uses the natural language understanding (NLU) module of the present invention to "digest" text stored in a full text storage and generate a cognitive model. The cognitive model is in first order logic (FOL) form. An index to the concepts in the cognitive model is also generated, so that the concepts can be located in the original full text for display.

A second process interprets a query and retrieves relevant material from the full text storage for review by the requester. The NLU module is used to generate a cognitive model of a text retrieval request (i.e., query). The cognitive model of the text and the cognitive model of the query are compared to identify similar concepts in each. Where a similar concept is found, the text associated with the concept is retrieved. Two passes (i.e., a high recall statistical pass and a relevance reasoning pass) are used to generate a short list of documents that are relevant to the query. The short list is ranked in order of relevance and is displayed to the user. The user selects texts and browses them in a display window.

DETAILED DESCRIPTION OF THE INVENTION

The present invention was made with Government support under Contract No. DAAA15-92-C-0025 awarded by the United States Department of the Army. The Government has certain rights in the invention.

A Natural Language Interpretation System is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
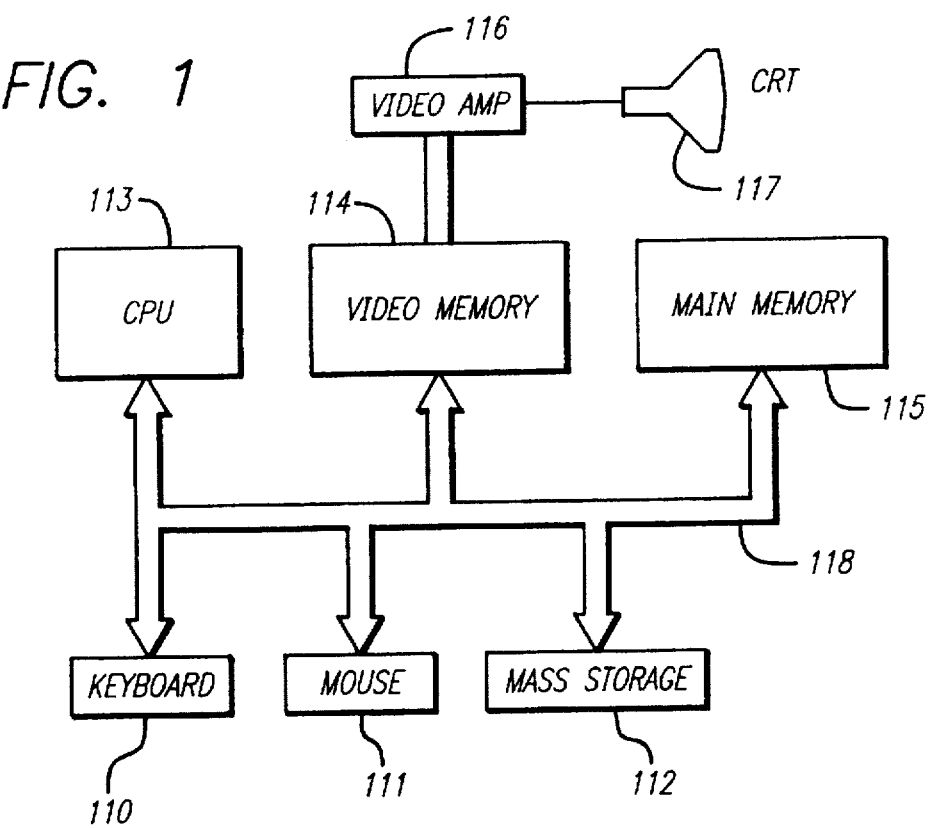
FIG. 1 illustrates a general purpose computer for implementing the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment.

The present invention is described below in relation to a text retrieval system. However, the present invention can be used with other applications to provide a human interface between the computer and the user or simulate human language interpretation. For example, the present invention can be used to automatically understand and interpret a book and generate an abstract for the book without human intervention. The present invention can be used to provide an interface to the Worldwide Web and the Information Highway.

Further, the present invention can be used to develop a natural language interface to a computer system such that a user can command a computer, robot, or write computer programs in a natural language. The present invention can be used to provide the ability for a robot to behave independently on the basis of world knowledge. Computers with the natural language capabilities of the present invention can begin to learn the environment just as a child does.

Natural Language Understanding

The present invention understands a natural language (e.g., English) in a way which is similar to human understanding. A natural language is both highly ambiguous (the same pattern can mean many different things), and redundant (the same meaning can be expressed with many different patterns). The present invention uses a Natural Language Understanding (NLU) module to analyze this complex structure, and unravel its meaning layer by layer. The NLU module receives a natural language input and generates a first order logic (FOL) output.

Figure 5:
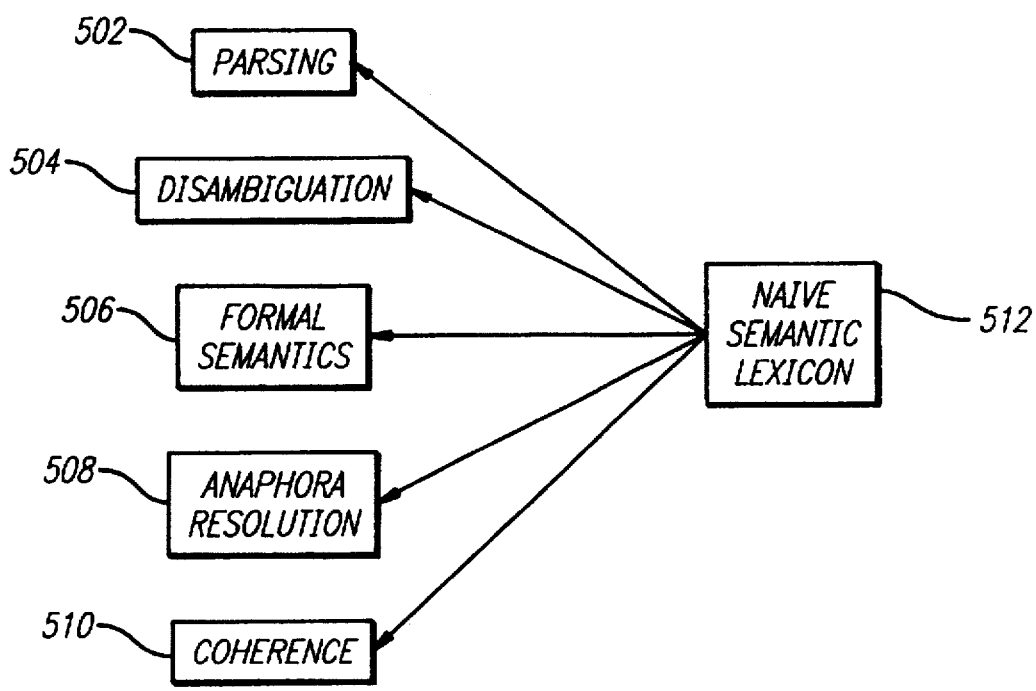
FIG. 5 provides an overview of the NLU module.

The NLU module blocks the combinatorial explosion that has occurred in the prior attempts to parse and understand natural language on a computer. The combinatorial explosion results from the many possible structures and meanings that can be given to words and phrases in a natural language. Further, the NLU module avoids the intractability of common sense reasoning. These problems have caused past attempts at interpreting natural languages to fail, as Charniak stated. The NLU module eliminates these problems and provides accurate interpretations. FIG. 5 provides an overview of the NLU module.

Parser 502 analyzes the grammatical parts of a natural language sentence or discourse and their roles relative to each other. For example, parser 502 identifies the noun, verb, etc. and determines what phrases modify what other portions (e.g., noun phrase or verb phrase) of the sentence.

In the invention, a left-corner head-driven parsing strategy is used. This parsing strategy mixes a top-down syntactic analysis strategy with a bottom-up syntactic analysis strategy. In a bottom-up strategy, the syntactic analysis is driven by the data (e.g., words or phrases) that is currently being processed. In a top-down strategy, the analysis is driven by expectations of what the data must be in order to conform to what is already known from the data previously processed. The advantage of this method is that you can have some expectations about what has not yet been heard (parsed) and can allow the expectations to be tempered (bottom up) by what is actually being heard (parsed). This strategy preserves some of the advantages of a top-down analysis (reducing memory requirements, integrating structure early in the analysis), while still avoiding some of the indeterminacy of a purely top-down analysis.

The mixed parsing strategy just described still faces a combinatorial explosion. Some of this comes from the indeterminacy just noted. That problem can be avoided by memorizing completed parts of the structure.

The disambiguation module 504 is embedded into the parser to avoid the extra work of pursuing unlikely parse pathways. As each structure is built, a naive semantic lexicon 512 is consulted to determine the semantic and pragmatic plausibility of each parsing structure. The naive semantic lexicon 512 contains a knowledge base that identifies word senses that fit within the context of the input being parsed.

The disambiguation module 504 eliminates structural and word sense ambiguity. Structural ambiguity is introduced in at least four ways: noun-verb ambiguity, prepositional phrases, conjunctions, and noun-noun combinations.

Many words have a noun-verb ambiguity and this ambiguity is a major source of the combinatorial explosion. Using naive semantic reasoning, the invention selects the most plausible part of speech for such ambiguous words. For example, the following sentence contains ambiguities:

Face places with arms down.

The words "face", "places" and "arm" in this sentence can be either a noun or a verb. The two words "face places" could form: 1) a noun-noun combination meaning "places for faces"; 2) a noun-verb combination with "face" meaning "pride" as in "save face", and place meaning the verb to "locate in a social status hierarchy; or 3) a verb-noun combination with "face" meaning command to place one's body with the one's face towards something and "places" a noun meaning seating positions at a table.

The present invention is able to select the third option as the most plausible interpretation for the phrase and the most plausible part of speech for each word in context. It selects a verb for "face" and a noun for "places" and "arms" in context because disambiguation reasoning finds that "with arms down" is a plausible modifying phrase for the verb "face" in the sense of position one's body. That choice carries with it the choice that "places" is a noun because noun for "places" is the only possibility if "face" is a verb.

Sentences with prepositional phrases after the object of the verb are ambiguous, because the first prepositional phrase after the object can modify the object, the verb, or the sentence constituent. The present invention provides a computational method for prepositional phrase disambiguation using preposition-specific rules, syntax and naive semantics. This is further described below under "Naive Semantic Reasoning".

Conjunctions (e.g., "and", "but", "as", and "because") serve to connect words, phrases, clauses, or sentences, for example. Conjoined noun phrases and verb phrases create a number of possible interpretations.

For example, in the sentence

The battery and line charged.

only one or two interpretations are plausible. However, the combinations of potential noun senses of "battery" and "line" and verb senses of "charge" amounts to 7*13*8 or 728 interpretations. Using the naive semantic lexicon 512, the disambiguation module 504 first reasons that only a few combinations of the two nouns "battery" and "line" are plausible. Two of the pairs are: 1) a battery of soldiers and a line of soldiers; and 2) the electrical device and the wire. Then, upon considering these pairs as subject of the verb "charge", the disambiguation module 504 selects the pair meaning soldiers, because the naive semantic lexicon 512 has sufficient common sense knowledge to exclude and reject "line" as subject of "charge". The appropriate meaning of "charge" does not accept a kind of wire as subject.

Noun-noun combinations such as "guerrilla attack" or "harbor attack" combine two or more nouns. These two examples, however, illustrate that each combination can create different meanings to the word "attack". For example, in the noun-noun combinations "guerrilla attack" and "harbor attack", "guerrilla" is the underlying subject of a sentence in which guerrillas attack and "harbor" is the object of the attack and the agent is not expressed. Naive semantic reasoning is used to disambiguate noun-noun combinations.

The other type of ambiguity is word sense ambiguity. Word sense ambiguity stems from the many possible meanings that a natural language places on each word in the language. The actual meaning is determined based on its use in a sentence and the meanings given to the other words during the interpretation process. To disambiguate a word, the present invention first uses syntactic clues. Then the present invention consults the naive semantic lexicon 512 to determine whether a possible sense of a word is reasonable given its context in the input being interpreted.

In the Formal Semantics module 506, the meaning of the natural language input is represented in a formal mathematical, logical language. The formal semantics module 506 translates natural language input into a logical form such as first order logical form.

Figure 6A:
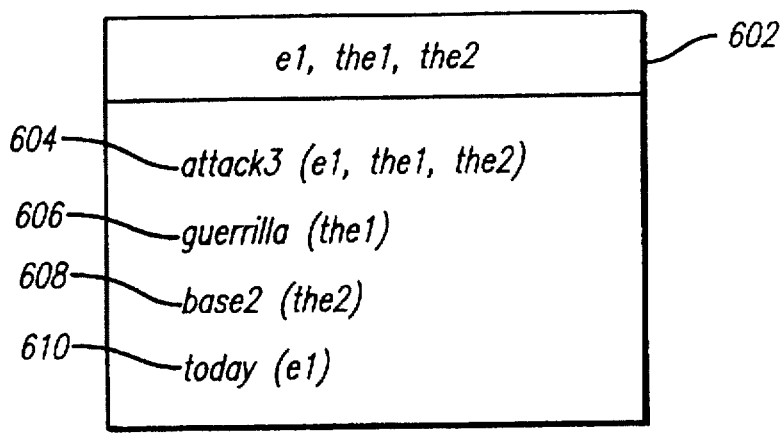
FIGS. 6A–6B provide examples of a Discourse Representation Structure.

In the formal semantics module 506, a sentence or discourse is translated into a discourse representation structure (DRS). In sentential semantic translation, a sentence is translated into a sentence-specific DRS and incorporates the effects of operators, such as negation, which can alter the interpretation. The sentence-specific DRS is then added to the overall DRS in discourse semantic translation. FIG. 6 provides an example of a DRS for a first sentence of a discourse:

"The base was attacked by the guerrillas today."

The DRS of FIG. 6 contains a list of indexed entities 604 that identify objects and events in the above sentence. For example, "e1" is the event of "attacking" and "the1" and "the2" represent the "guerrilla" and "base2" entities, respectively. The DRS further contains first-order representations 604, 606, 608, and 610 that depict properties and relations expressed in the sentence. For example, representation 604 indicates that event "e1" (i.e., attacking) is the event in which "the1" ("guerrilla") relates to entity "the2" (i.e., "base2") in an attacking event in which "the1" is the attacker and "the2" is the attackee. Representation 610 indicates that event "e1" occurred "today". Notice that words are replaced by concepts: "attack3" is the physical attack concept expressed by the "word attack" and "base2" is the concept of a military base.

The formal semantics module 506 generates output (e.g., DRS) that conveys the truth-conditional properties of a sentence or discourse. That is, the truths or negatives that are meant to be believed by the communication of the sentence or discourse. Later, when the system interprets a query and tries to retrieve texts which are relevant to the query, the relevance reasoning module 412 is used deductively to determine whether the truth conditions asserted in the sentence or discourse conform to the truth conditions contained in a query. In other words, using deduction, the relevance reasoning module 412 determines whether the world of some text in the document database conforms to the world of the query. The use of deduction makes this computation feasible and speedy.

A DRS is translatable into FOL. The FOL is then preferably translated into a programming language such as PROLOG, or a computational knowledge base. By translating the FOL into a programming language, standard programming methods can be applied in the relevance reasoning module 412.

Translation to a "logical form" suitable for reasoning, and also into discourse structures is appropriate for determining the possible antecedents of anaphors and descriptions. The published "discourse representation theory" (DRT) model and structures of Kamp and Asher are adapted for use here.

In the anaphora resolution module 508, entities are tracked and equated as they are mentioned in a sentence or discourse. Anaphora resolution module 508 links pronouns (e.g., he, she, and they) and the noun to which they refer. For example, the following provides an illustration of a discourse that includes the sentence previously illustrated (sentence S1) and a second sentence (S2):

S1: "The base was attacked by guerrillas today."

Figure 6B:
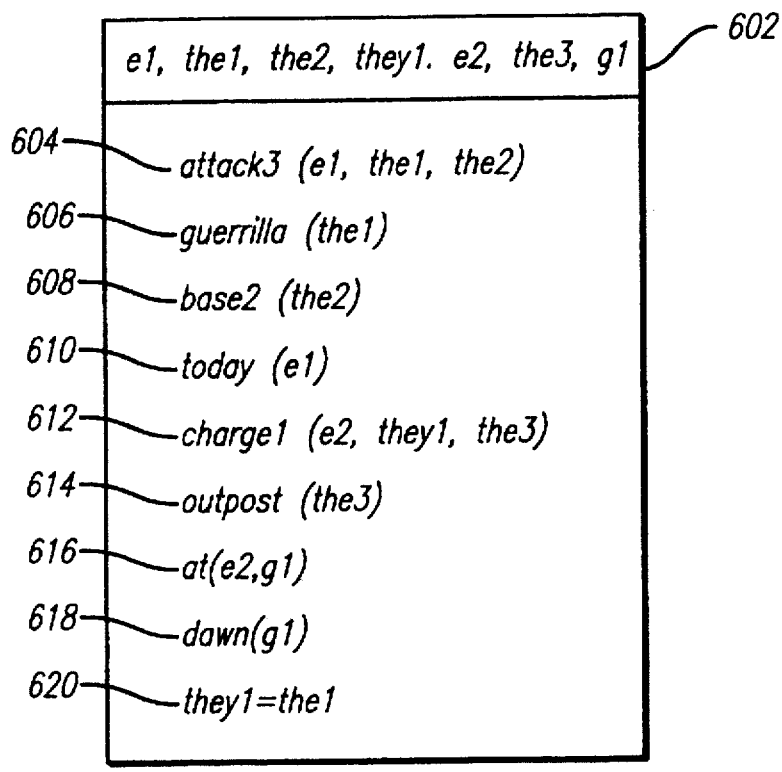

S2: "They charged the outpost at dawn." FIG. 6B illustrates a modified DRS that includes sentences S1 and S2 of the discourse. With the addition of sentence S2 in the discourse, additional objects and events are added to representation 602. For example, "they1" is added to refer to the object "they", "e2" to refer to the verb "charged", "the3" to refer to "outpost" and g1 to refer to "dawn". First Order representations 612, 614, 616, 618, and 620 are added for this sentence. The anaphora resolution module 508, for example, resolves the occurrence of "they" in the second sentence and equates it to "the1" (i.e., guerrillas) in representation 620. The naive semantic reasoning module 512 is consulted to determine whether guerrillas would charge an outpost as stated in sentence S2, for example.

The coherence module 510 determines the parts of the sentence or discourse that cohere or relate. The coherence module 510 determines the relationships that exist in the natural language input. For example, the coherence module 510 identifies a causal relationship. A causal relationship may exist, for example, in text such that a first portion of text provides the cause of something that occurs later in the text. Another relationship is an exemplification relationship. Such a relationship exists between two text segments where one further provides an example of the other. Goal and enablement are other examples of relationships that can be recognized by the coherence module 510.

The coherence module 510 builds a coherent model of a "world" based on the interpretation of the natural language input. The coherence module 510 uses the naive semantic reasoning module 512 to determine whether a coherence alternative is plausible. Using sentences S1 and S2 in the previous discourse illustration, for example, an inference can be made that "e1" ("attacked") and "e2" ("charged")

cohere such that event "e2" occurred as part of event "e1". That is, the act of charging occurred during the attacking event. Thus, the naive semantic reasoning module 512 can be used to determine that one event is broader than the other such that the latter occurred as part of the former. The present invention identifies a subevent of another event as a "constituency". Using the same discourse illustration, the charging event ("e2") is a constituent of the attack event ("e1) is represented as:

"constituency (e1, e2)"

Naive Semantic Reasoning

As indicated above, the naive semantic lexicon 512 is consulted in the parser module 502, disambiguation module 504, formal semantics module 506, anaphora resolution module 508, and the coherence module 510 to bring common sense or world knowledge to bear in the decisions on structure and meaning made by a module. The naive semantic lexicon module 512 provides knowledge that is used to allow the NLU module to reason about the likely situation to which the words in a natural language input might be referring.

To eliminate the combinatorial explosion, the naive semantic lexicon 512 is consulted during each segment of the NLU module. In the parser 502, for example, the naive semantic lexicon 512 is consulted whenever parser 502 wishes to make a structural assumption about the natural language input (e.g., to connect a phrase or word to another phrase or word). At each of these decision points, the disambiguation module 504 consults the naive semantic lexicon 512 to assist in determining whether a disambiguation alternative is plausible.

The naive semantic lexicon 512 brings common sense (world knowledge) to bear on the interpretation performed by the NLU module. Common sense provides the ability to eliminate implausible or nonsensical structures or interpretations of the natural language input. The following two sentences serve to illustrate how common sense can be used during interpretation:

"John bought the lock with the money."

"John bought the lock with the key."

To interpret the first sentence, one possible alternative is to connect the prepositional phrase "with the money" to the verb "bought." Another possible alternative is that the phrase "with the money" modifies "lock". When a person hears this sentence, he knows that a lock does not normally come packaged with money. He can, therefore, apply common sense to rule out the second alternative. Based on his common sense, he can determine the meaning of the first sentence to be that someone paid cash to purchase a lock.

Further, while there are several meanings for the word lock (e.g., a security device or an enclosed part of a canal), a person can again apply common sense to select the meaning of the word that would most likely be the intended meaning. In this case, the person would pick the meaning that is most common (i.e., a security device). Therefore, the person uses common sense to interpret the sentence to mean that someone named John paid cash to purchase a security device.

Similarly, an individual can use common sense to connect words and phrases in the second sentence. In this case, the individual's prior knowledge would indicate that a lock is usually not bought using a key as tender. Instead, the individual would connect the "lock" and "with a key". A common sense meaning of a security device can be assigned to the word "key". Thus, the sentence is interpreted to mean that someone named "John" purchased both a security device and a key that can unlock this device.

A person's knowledge base provides the criteria used to interpret the world. In the usual case, a shallow layer of knowledge about an object or event, for example, is accessed by a person during language interpretation, as has been shown in psycholinguistic research studies of human language interpretation. This shallow layer of knowledge is the knowledge that is most likely to be true most of the time or is believed to be most likely. The term "naive" of naive semantics indicates that the knowledge required to understand language is not scientific and may not be true. The naive semantic lexicon is not intended to incorporate all knowledge or all of science. Rather, the naive semantic lexicon is intended to incorporate the same shallow level of knowledge used by a person to interpret language. By making the knowledge probabilistic, the present invention does not have to consider possible interpretations that are implausible (or false in the typical case).

The naive semantic lexicon has two aspects: ontology and description. In the ontology, a concept is classified within a classification scheme. The descriptive aspect of the naive semantic lexicon identifies properties (e.g., shape, size, function) of a concept (or phrase).

The present invention uses a classification scheme referred to as a "naive semantic ontology". The naive semantic ontology is described in Dahlgren, *Naive Semantics for Natural Language Understanding*, (Kluwer Academic Publishers 1988) and is incorporated herein by reference. The naive semantic ontology provides a representation for basic concepts and interrelations. Using the ontology, objects and events are sorted into major categories. The ontology reflects a common sense view (naive view) of the structure of the actual world. It encodes the major category cuts of the environment recognized by the natural language that it models, and is based upon scientific findings in cognitive psychology.

Figure 7:
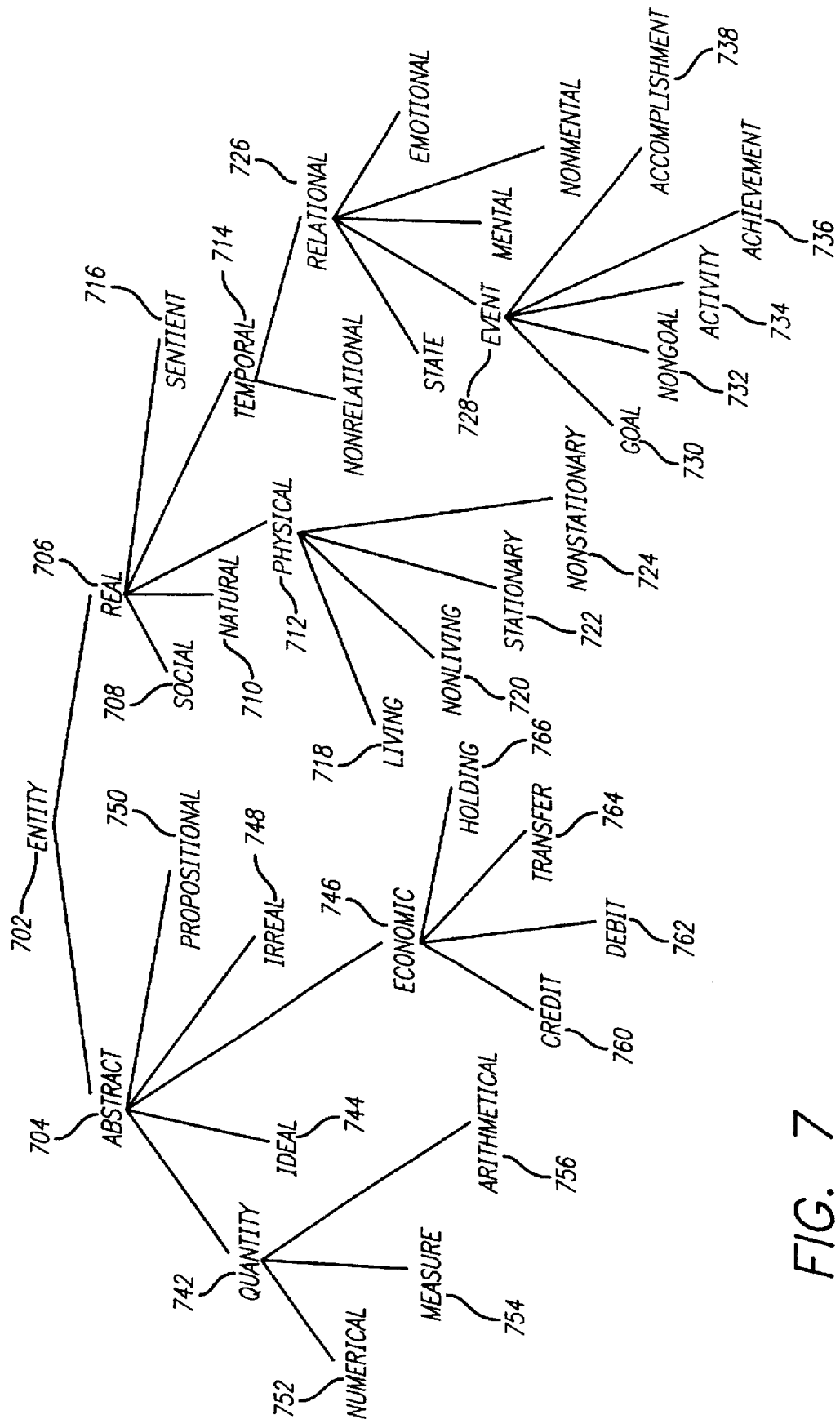
FIG. 7 illustrates an ontology that can be used to classify word senses in the English language.

FIG. 7 illustrates an ontology that can be used to classify nouns in the English language. Entity 702 includes the Abstract 704 and Real 706 sub-classifications. Thus, an entity can be either abstract or real, for example. If the entity is classified under Real 706, the entity can be further classified as Social 708, Natural 710, Physical 712, Temporal 714, or Sentient 716, for example.

An entity that is classified as Real 706 and Physical 712, is further classified as either Living 718, Nonliving 720, Stationary 722, or Nonstationary 724, for example. To further illustrate, an event is classified as an Entity 702, Temporal 714, Relational 726, and Event 728. Event 728 has sub-classifications Goal 730, Nongoal 732, Activity 734, Achievement 736, and Accomplishment 738, for example, that can be used to further classify an event.

Using the ontological classification illustrated by FIG. 7, an entity can also be classified as Abstract 704. Within the Abstract 704 sub-classification, there is a Quantity 742, Ideal 744, Economic 746, Irreal 748, and Propositional 750 sub-classification. An entity that is classified as Abstract 740 and as a Quantity 742 can be further classified as either Numerical 752, Measure 754, or Arithmetical 756. Similarly, an abstract entity can be classified as Economic 746 and then within either a Credit 760, Debit 762, Transfer 764, or Holding 766 sub-classification, for example.

Other ontological classifications can also be used to further identify classifications for a knowledge base. Multiple ontological classifications can be used to further emulate human knowledge and reasoning. A human may cross-classify a natural language concept. Thus, for example, an entity may be classified as either Social 708 or Natural 710 using the onotology illustrated in FIG. 7. Further, the same entity may be classified as either Physical 712, Sentient 716, or Temporal 714. A Social 708, Sentient 716 is a "secretary"; a Social 708, Physical 712 is a "wrench"; and a Social 708, Temporal 714 is a "party". On the other hand a Natural 710, Sentient 716 is a "person"; a Natural 710, Physical 712 is a "rock"; and a Natural 710, Temporal 714 is an "earthquake". The ontology assumes instantiations may be multiply attached to classifications within an ontology. Thus, for example a person may be classified as Physical 712 and Living 718 as well as Sentient 716.

The lexicon 512 relates words in a natural language to the basic ontological concepts. The lexicon connects syntactic information (e.g., noun or verb) with the meaning of a word sense. The lexicon further specifies additional word-specific common sense knowledge. The lexicon specifically relates the syntactic context of each word to the possible meanings that the word can have in each context.

Figure 8:
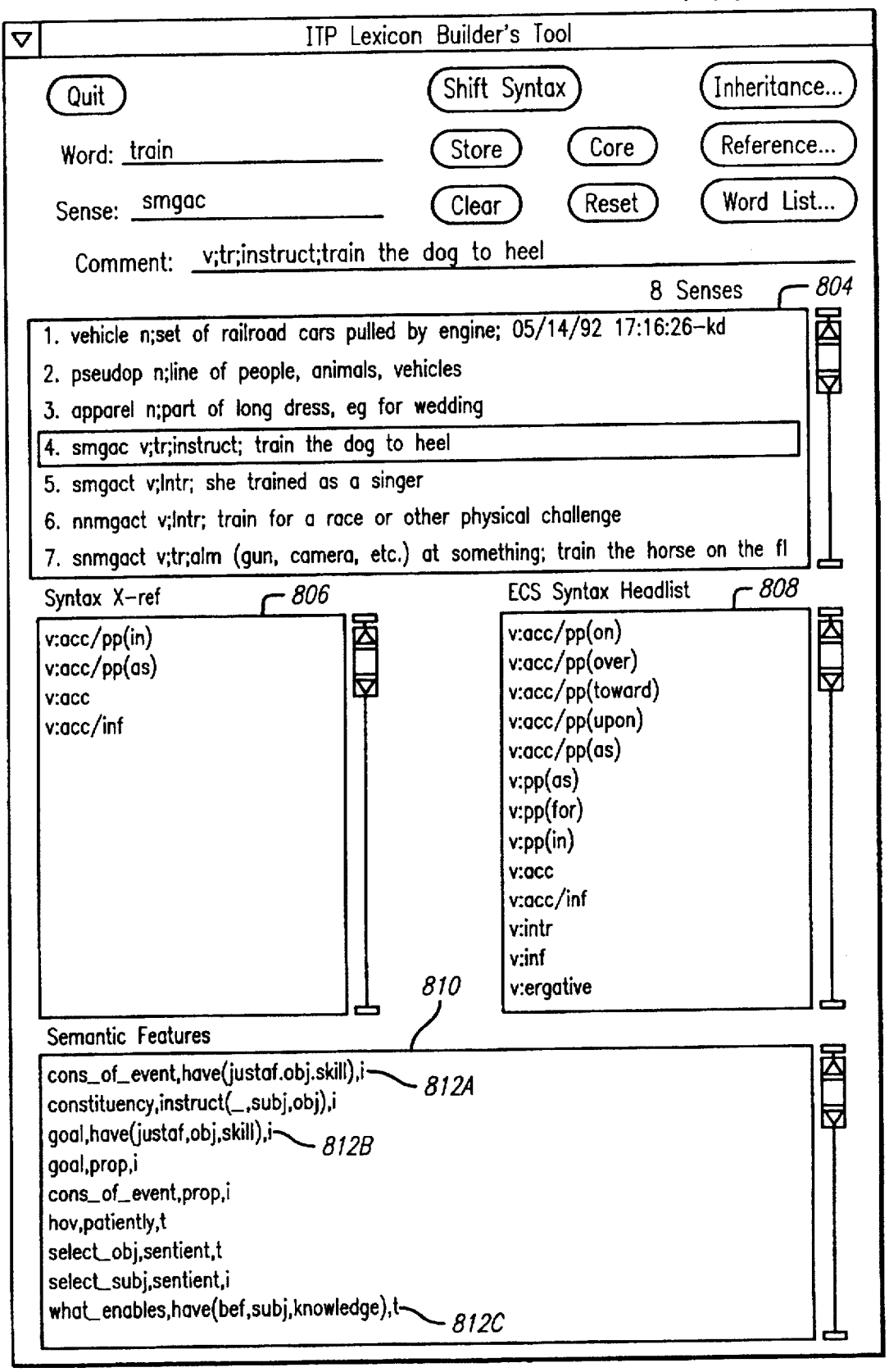
FIG. 8 illustrates a dictionary entry used in the present invention.

FIG. 8 illustrates a dictionary entry used in the present invention. As indicated in the header portion 802 of the dictionary entry, the entry contains information about the word "train". The word "train" can be, for example, a noun or a verb. In the sense portion 804 of the dictionary entry, there are seven different senses of the word train (numbered one to seven). Each entry in the sense portion 804 ("1"–"7") identifies a common sense use for the word "train". Further, each sense identifies the ontological attachment. Each sense has syntactic information and semantic properties associated with it.

For example, entry "4" in sense portion 804 identifies a word sense that means "instruct" such as to "train a dog to heel". The "smgac" identifier in entry "4" links this meaning of "train" to a node in the ontological scheme. Sense portion 804 contains other senses of the word "train" including "set of railroad cars pulled by engine" (noun, entry "1"), "line of people, animals, vehicles" (noun, entry "2"), "part of long dress, eg for wedding" (noun, entry "3"), and "she trained as a singer" (verb, entry "5").

An entry further includes syntactic information. Entry "4" has syntactic properties as indicated in syntactic portions 806 and 808. Syntactic portion 806 indicates that the sense of the word "train" identified by entry "4" in sense portion 804 is a verb that takes an accusative object with a prepositional phrase beginning with the word "in", for example. Other syntactic features are identified in syntactic portion 806. For example, sense entry "4" of sense portion 804 can be a verb with an accusative object and an infinitival (e.g., train someone to. . . ).

A dictionary entry further includes semantic features. The semantic features portion 810 can, for example, provide coherence information that can be used to form relationships such as those formed in the coherence module 510. For example, in entry 812A, the consequence of the training event is identified. That is, for example, the consequence of the training event is that the entity trained has a skill. Further, as indicated in entry 812B, the goal of being trained is to have a skill. As indicated in entry 812C, knowledge is what enables one to train.

To understand and interpret input, people use any number of different concepts. People are not limited to a finite number of primitive concepts from which all other concepts are generated. Therefore, lexicon 512 includes entries that represent natural language concepts that can themselves be represented in terms of the other concepts, in much the same way as people formulate concepts. In the present invention, concepts do not have to be represented in a language consisting only of primitives. In the present invention, an open-ended number of different concepts can occur as feature values.

The semantic features portion 810 contains semantic feature values (e.g., entries 812A–812C) that represent natural language concepts. Preferably, these feature values are expressed in FOL for ease of deductive reasoning. Each semantic feature value can contain elements that are part of the representation language and also elements which are other concepts of natural language.

Referring to FIG. 8, "cons_of_event" in entry 812A and "goal" in 812B are examples of elements of a representation language. The feature values "knowledge" (in feature entry 812C) and "skill" (in feature entry 812B) are not elements of the representation language. Rather, they are themselves natural language concepts. The "knowledge" and "skill" concepts each have a separate entry in the dictionary (or lexicon).

Preferably, the dictionary information is represented in data structures for access during processing. For example, the basic onotological information is encoded in simple arrays for fast access. Further, propositional commonsense knowledge is represented in first order logic (an extension of "Horn clause" logic) for fast deductive methods.

The tasks performed by modules 502, 504, 506, 508, 510, and 512 can be performed serially or in parallel. In the preferred embodiment, the tasks are performed in parallel. Using parallel processing, the interpretation processes performed by these modules can be performed faster.

The naive semantic lexicon includes at least the following properties: 1) psychologically-motivated representations of human concepts (see senses 804, syntax 806, and semantic features 810); 2) shallow, superficial common sense knowledge (see semantic features 810); 3) knowledge is open-ended and can contain other concepts as well as elements of a representation language (see semantic features 810); 4) concepts are tied to natural language word senses (see senses 804); 5) concepts are tied to syntactic properties of word senses (see syntax 806); and 6) feature values are expressed in FOL for ease of deductive reasoning (see semantic features 810).

Natural Language Text Interpretation and Retrieval

As previously indicated, the present invention can be used to provide a computerized system for retrieving text from a document database in response to a human language query. For example, the user describes a topic, or question, in a human language (e.g., English). The system displays a list of relevant documents by title in response to the query. An indication of the perceived relevancy of each title is also indicated. The user can use this indication to determine the viewing order of the returned documents. The user selects a document to browse by selecting its title. Once the user selects a document, the document is displayed in a scrollable window with the relevant sections highlighted.

Figure 2:
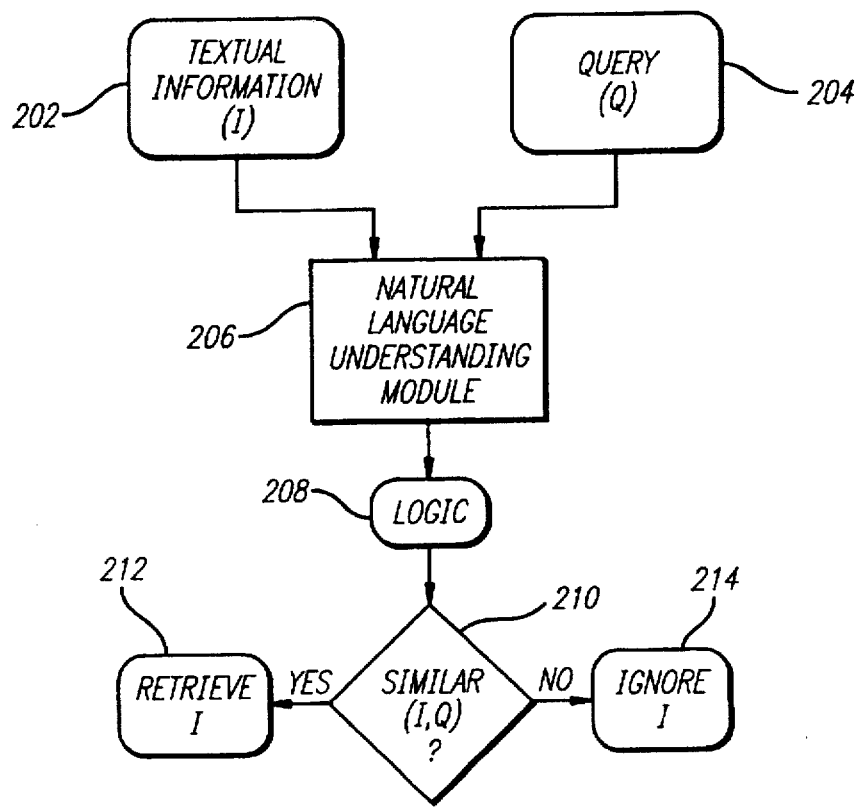
FIG. 2 provides an overview of a text retrieval system that uses the natural language understanding capabilities of the present invention.

A document retrieval system such as the one just described comprises two distinct tasks: digestion and search. Both tasks use the natural language interpretation capabilities of the present invention. FIG. 2 provides an overview of a text retrieval system that uses the natural language interpretation capabilities of the present invention. At step 202, Textual Information is input to the Natural Language Understanding (NLU) module, and at step 206 the NLU module generates a cognitive model of the input text 202. The cognitive model 208 is in the form of FOL. Cognitive model 208 contains inferences from what the text says directly and is based upon inferences from the world knowledge.

Once a cognitive model is generated for the document database, a search request can be used to specify the search criteria. The document(s) that satisfy the search criteria are then retrieved for review by the user. Thus, at step 204, a query is input. The NLU module is used to generate a cognitive model of the search request at step 208. At decision step 210 (i.e., "Similar (I.Q)?), the cognitive model of the search request is matched to the cognitive model of each document in the database. If they are similar, the information is retrieved at step 212. If they are not, the information is not retrieved at step 214. Steps 210, 212, and 214 can be repeated while there are still documents to compare against the search request or the search is aborted, for example.

The process of digesting the information input at step 202 is performed independently of the process of understanding the search request input at step 204. The process of digesting the information can, therefore, be performed in a batch mode during non-peak time (i.e., the time that the system is normally used for text retrieval). The process of understanding the search request and retrieving the text can be performed any time that a user wishes to perform a search. By separating the resource-intensive digestion of the information from a search request and information retrieval, a timely response to a search request can be provided to the user.

Figure 3:
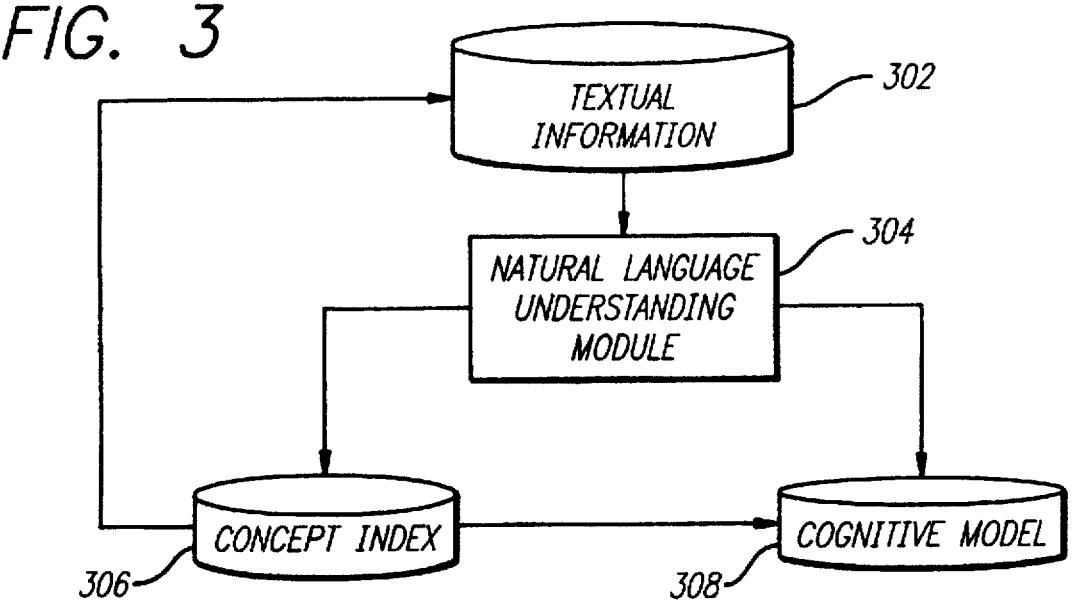
FIG. 3 illustrates a model generation and information classification architecture.

The first of the two independent processes, the process of digesting information, uses the NLU module along with the input textual information to generate a cognitive model of the text. FIG. 3 illustrates a model generation architecture. Textual information 302 becomes input to the NLU module at step 306. The output of the NLU module is a cognitive model 308 in FOL. The cognitive model and the textual information are connected by the concept index 306 which locates the concepts in the cognitive model in the original text for display. Notice that disambiguated, interpreted concepts from the meaning and content of the text are remembered, rather than the word patterns (strings) which are indexed in keyword-based text retrieval.

Figure 4:
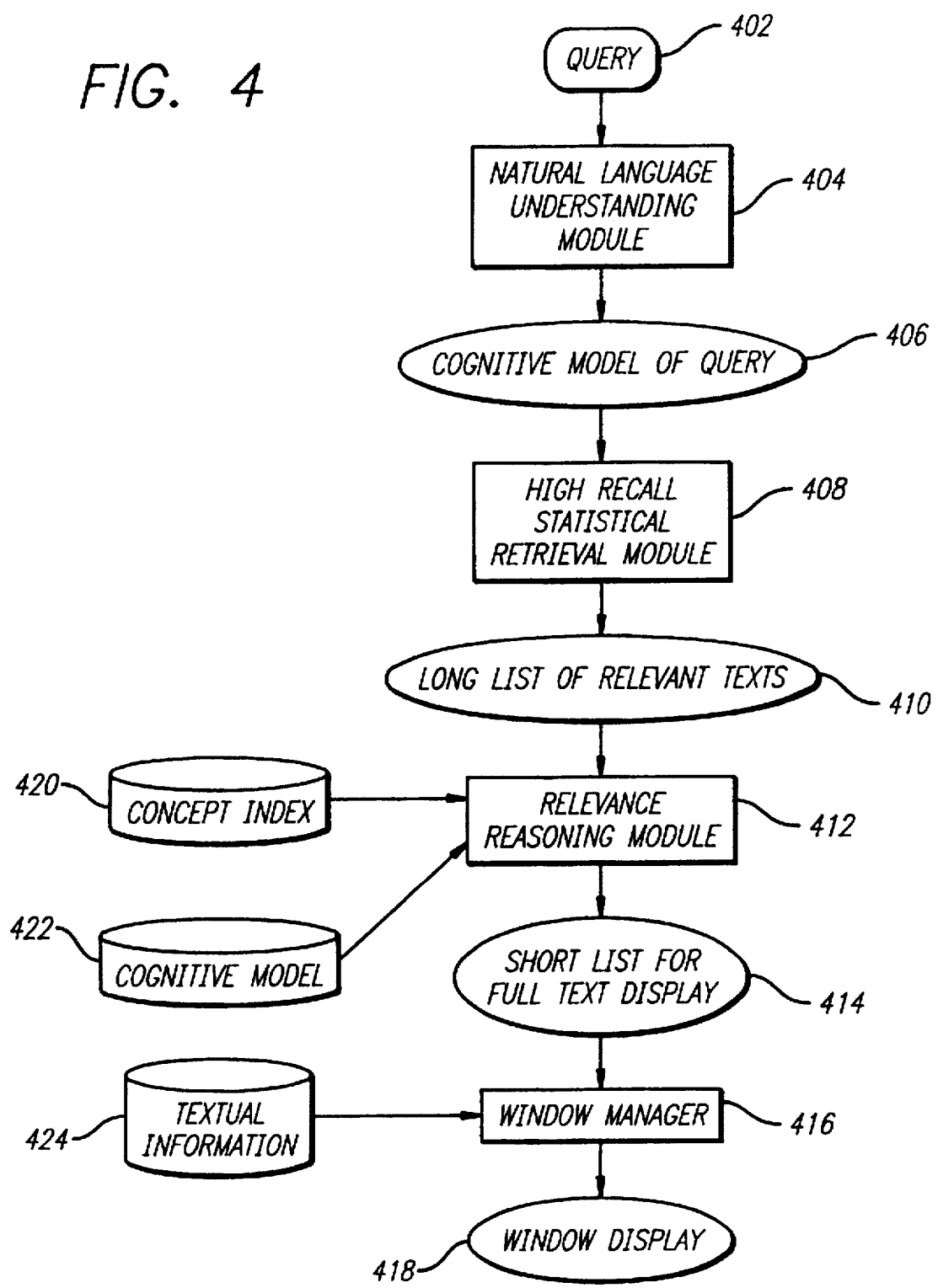
FIG. 4 provides an illustration of a Text Retrieval Architecture.

The concept index 306 is used in the second process to retrieve text. FIG. 4 provides an illustration of a Text Retrieval Architecture. Preferably, a search takes place in two passes. The first pass, a high recall statistical retrieval, locates a "long list" of relevant documents. Instead of basing the statistical approach on the words in the text, the statistics can be based on the disambiguated concepts that appear in the text. The second pass, a relevance reasoning pass, refines the "long list" to produce a "short list" of selected texts that are truly relevant to the query.

The flow of processing begins with a query or search request that is stated in a natural language (e.g., English) at step 402. The query is input the NLU module at step 404. The NLU module generates a cognitive model of the query at step 406. At step 408, the High Recall Statistical Retrieval (HRSR) Module applies statistical methods in parallel to the concept index to produce the "long list" of relevant texts. The HRSR Module applies a loose filtering mechanism, for example, to find all of the relevant texts (and potentially some irrelevant ones). At step 410, the "long list" becomes the input to the second pass performed by the Relevance Reasoning (RR) Module that refines the "long list". At step 412, the RR selects the truly relevant texts from the "long list". The entire cognitive model of each text in the "long list" is brought into memory and compared with the cognitive model of the query. The RR module applies FOL theorem-proving and human-like reasoning. The output, at step 414, is a "short list" that identifies all of the text that is relevant to the query. At step 416, the "short list" can be used to generate windows that include, for example, the "short list" and a display of the relevant text. At step 418, one or more such windows are displayed for review by the search requester.

Thus, a Natural Language Understanding System has been provided.

We claim:

1. A method for interpreting natural language input using a computer system comprising the steps of:

parsing said natural language input;

disambiguating meanings and structure of said natural language input;

generating a discourse representation, said discourse representation identifying said structure for said natural language input, meanings of words and relationships between components of said structure;

resolving references in said natural language input;

determining relationships that exist in said natural language input;

consulting, within each of the above steps, a naive semantic lexicon to determine the plausibility of interpretative decisions made within each of the above steps, said naive semantic lexicon having at least one entry that identifies at least one sense of a word, said entry including a reference to an ontological classification network, syntactic information, and a plurality of semantic properties.

2. The method of claim 1 wherein said parsing step further comprises the steps of:

parsing a word in said natural language input; and analyzing said word relative to other words in said natural language input.

3. The method of claim 1 wherein said disambiguation step further comprises the steps of:

eliminating structural ambiguity in said natural language input; and eliminating word sense ambiguity in said natural language input.

4. The method of claim 1 wherein said consulting step further comprises the steps of:

identifying an entry in a dictionary for a word contained in said natural language input;

identifying a plurality of common sense meanings of said word contained in said natural language input;

identifying syntactic information associated with each of said plurality of common sense meanings; and identifying semantic information associated with said each of said plurality of common sense meanings.

5. The method of claim 4 wherein said semantic information is used to determine said relationships in said natural language input.

6. The method of claim 4 wherein said semantic information includes references to a plurality of entries in said dictionary.

7. The method of claim 4 wherein said semantic information is expressed in a first order logic form.

8. The method of claim 1 wherein said ontological classification network comprises a classification of concepts and relationships between classifications in said classification of concepts.

9. The method of claim 1 wherein said step of generating a discourse representation further comprising the steps of:

generating a partial discourse representation for a subset of said natural language input; and adding said partial discourse representation to an overall discourse representation for said natural language input.

10. The method of claim 1 wherein said resolving step further comprises the step of translating said discourse representation into a logical form.

11. The method of claim 10 wherein said logical form is a first order logical form.

12. The method of claim 11 further comprising the step of translating said logical form into a programming language.

13. The method of claim 12 wherein said programming language is PROLOG.

14. The method of claim 1 wherein said resolving step further comprises the step of generating truth-conditional properties for said discourse representation.

15. The method of claim 1 wherein said steps are performed in parallel.

16. The method of claim 15 wherein said list generation step further comprises the steps of:

inputting said query's cognitive model to a Relevance Reasoning Module; and generating, using said Relevance Reasoning Module, a short list of relevant text.

17. A method for retrieving text comprising the steps of:

inputting textual information to a natural language understanding module;

translating, using said natural language understanding module, said textual information into a logic form which expresses objects and events in said textual information as concepts and relationships between said concepts that identify the structure expressed in said textual information;

inputting a query to said natural language understanding module;

translating, using said natural language understanding module, said query into a logic form which expresses objects and events in said query as concepts and relationships between said concepts that identify the structure expressed in said query;

comparing said logic form of said query to said logic form of said textual information; and retrieving said textual information when said query's logic form is similar to said textual information's logic form.

18. A method for creating a cognitive model comprising the steps of:

storing textual information in storage of said computer system;

inputting said textual information to a natural language understanding (NLU) module, said NLU module comprising parsing, disambiguation, formal semantics, anaphora resolution and coherence modules that consult a naive semantic lexicon having at least one entry that identifies at least one sense of a word, said entry including a reference to an ontological classification network, syntactic information and a plurality of semantic properties;

generating, using said natural language understanding module, a cognitive model which expresses objects and events in said textual information as concepts and relationships between said concepts that identify the structure expressed in said textual information; and generating a concept index of said concepts in said cognitive model, said concept index is used to locate the textual information associated with concepts in said cognitive model.

19. A method for retrieving text in a computer system comprising the steps of:

storing in said computer system textual information;

generating, using a natural language understanding module comprising parsing, disambiguation, formal semantics, anaphora resolution and coherence modules consulting a naive semantic lexicon having at least one entry that identifies at least one sense of a word, said entry including a reference to an ontological classification network, syntactic information and a plurality of semantic properties, a cognitive model of said textual information which expresses objects and events in said textual information as concepts and relationships between said concepts that identify the structure expressed in said textual information;

generating, using said natural language understanding module, a cognitive model of a query which expresses objects and events in said query as concepts and relationships between said concepts that identify the structure expressed in said query; and generating a list of textual information relevant to said query based on said cognitive model of said textual information and said cognitive model of said query.

20. The method of claim 19 wherein said list generation step further comprises the steps of:

inputting said query's cognitive model to a High Recall Statistical Retrieval (HSRS) Module of said computer system;

generating, using said HSRS Module, a long list of relevant text;

inputting said long list of relevant text to a Relevance Reasoning Module; and generating, using said Relevance Reasoning Module, a short list of relevant text.

21. The method of claim 20 wherein said long list generation step uses a statistical method.

22. The method of claim 21 wherein said statistical method is a loose filtering method.

23. The method of claim 20 wherein said short list generation step further comprises the steps of:

selecting an entry in said long list;

retrieving, from said textual information's cognitive model, a cognitive model of text associated with said entry;

comparing said text's cognitive model with said cognitive model of said query; and selecting said entry for said short list when said text's cognitive model is similar to said query's cognitive model.

24. The method of claim 20 wherein said Relevance Reasoning Module further comprises the steps of:

identifying truth conditions asserted in said text;

identifying truth conditions asserted in said query; and determining deductively whether said text's truth conditions conform to said query's truth conditions.

25. An article of manufacture comprising:

a computer usable medium having computer readable program code embodied therein for interpreting natural language input comprising:

computer readable program code configured to cause a computer to parse said natural language input driven by the content of said natural language input and expectations about said natural language input using a naive semantic lexicon having at least one entry that identifies at least one sense of a word, said entry including a reference to an ontological classification network, syntactic information, and a plurality of semantic properties;

computer readable program code configured to cause a computer to disambiguate during said parse said natural language input using said naive semantic lexicon;

computer readable program code configured to cause a computer to generate a discourse representation said natural language input using said naive semantic lexicon;

computer readable program code configured to cause a computer to resolve references in said natural language input using said naive semantic lexicon; and computer readable program code configured to cause a computer to determine relationships that exist in said natural language input using said naive semantic lexicon.

26. The article of manufacture of claim 15 wherein said computer readable code configured to cause a computer to parse further comprises:

computer readable code configured to cause a computer to parse a word in said natural language input; and computer readable code configured to cause a computer to analyze said word relative to other words in said natural language input.

27. The article of manufacture of claim 25 wherein said computer readable code configured to cause a computer to disambiguate further comprises:

computer readable code configured to cause a computer to eliminate structural ambiguity in said natural language input; and computer readable code configured to cause a computer to eliminate word sense ambiguity in said natural language input.

28. The article of manufacture of claim 25 wherein said ontological classification network comprises a classification of concepts and relationships between classifications in said classification of concepts.

29. The article of manufacture of claim 25 wherein said computer readable code configured to cause a computer to generate a discourse representation further comprises:

computer readable code configured to cause a computer to generate a partial discourse representation for a subset of said natural language input; and computer readable code configured to cause a computer to add said partial discourse representation to an overall discourse representation for said natural language input.

30. The article of manufacture of claim 25 wherein said computer readable code configured to cause a computer to resolve further comprises:

computer readable code configured to cause a computer to translate said natural language input into a discourse representation structure; and computer readable code configured to cause a computer to translate said discourse representation structure into a logical form.

* * * * *